US011612272B2

(12) United States Patent
Giorgella (10) Patent No.: US 11,612,272 B2
(45) Date of Patent: Mar. 28, 2023

(54) COFFEE DISPENSER

(71) Applicant: Invento Pty Ltd, Scarborough (AU)

(72) Inventor: Luca Giorgella, Scarborough (AU)

(73) Assignee: Invento Pty Ltd, Scarborough (AU)

( * ) Notice: Subject to any disclaimer, the term of this patent is extended or adjusted under 35 U.S.C. 154(b) by 995 days.

(21) Appl. No.: 16/197,223

(22) Filed: Nov. 20, 2018

(65) Prior Publication Data

US 2019/0082892 A1    Mar. 21, 2019

Related U.S. Application Data

(63) Continuation of application No. PCT/AU2017/050379, filed on Apr. 27, 2017.

(30) Foreign Application Priority Data

Jun. 2, 2016   (AU) .................................. 2016902129
Jan. 31, 2017  (AU) .................................. 2017900277

(51) Int. Cl.
*A47J 42/40*    (2006.01)
*A47J 31/42*    (2006.01)
*A47J 31/44*    (2006.01)
*A47J 31/06*    (2006.01)
(Continued)

(52) U.S. Cl.
CPC ............... *A47J 42/40* (2013.01); *A47J 31/42* (2013.01); *A47J 31/446* (2013.01);
(Continued)

(58) Field of Classification Search
CPC .. A47J 42/40; A47J 42/50; A47J 42/42; A47J 31/42; A47J 31/446; A47J 31/4467;
(Continued)

(56) References Cited

U.S. PATENT DOCUMENTS 5,791,526 A      8/1998  Landais et al.
6,095,032 A  *   8/2000  Barnett ................. A47J 31/404
                                                              100/145
(Continued)

FOREIGN PATENT DOCUMENTS

AU    2012268779 A1  *  7/2013
CN       200992363 Y    12/2007
(Continued)

OTHER PUBLICATIONS

International Search Report and Written Opinion dated Jun. 22, 2017 in International Patent Application No. PCT/AU2017/050379. 8 pages.

(Continued)

*Primary Examiner* — Tu B Hoang
*Assistant Examiner* — Alba T Rosario-Aponte
(74) *Attorney, Agent, or Firm* — Kilpatrick Townsend & Stockton LLP (57) ABSTRACT

A coffee dispenser comprises an inlet for receiving ground coffee, a ground coffee holder that receives ground coffee from the inlet, and a porta filter carriage for receiving a porta filter. The porta filter carriage is movable relative to the ground coffee holder between a closed position and a dispensing position. When a porta filter is received in the porta filter carriage, movement of the porta filter carriage from the closed position to the dispensing position causes coffee to be dispensed into the filter basket. Movement of the porta filter carriage from the dispensing position to the closed position causes a scraping action to occur across the coffee disposed in the filter basket, thereby removing excess coffee from the filter basket.

16 Claims, 6 Drawing Sheets

(51) Int. Cl.
*A47J 31/40* (2006.01)
*A47J 42/50* (2006.01)
*A47J 43/046* (2006.01)

(52) U.S. Cl.
CPC .......... *A47J 31/0663* (2013.01); *A47J 31/404* (2013.01); *A47J 42/50* (2013.01); *A47J 43/046* (2013.01)

(58) Field of Classification Search
CPC .. A47J 31/0663; A47J 31/0657; A47J 31/404; A47J 43/046
USPC .......................................... 219/323, 279, 275
See application file for complete search history.

(56) References Cited

U.S. PATENT DOCUMENTS

| | | |
|---|---|---|
| 2011/0283889 A1 | 11/2011 | Con et al. |
| 2014/0123857 A1 | 5/2014 | Rego |
| 2014/0203118 A1* | 7/2014 | Rego ........................ A47J 42/44 241/6 |
| 2014/0356502 A1 | 12/2014 | Goeltenboth et al. |
| 2015/0136496 A1* | 5/2015 | Rego ........................ A47J 42/44 177/132 |
| 2016/0088975 A1 | 3/2016 | King |
| 2016/0128507 A1* | 5/2016 | Grassia ................... A47J 31/42 99/280 |

FOREIGN PATENT DOCUMENTS

| | | | | |
|---|---|---|---|---|
| NL | 2007126 C2 * | 1/2013 | .............. | A47J 31/44 |
| WO | 0027262 A1 | 5/2000 | | |
| WO | 2013015801 A1 | 1/2013 | | |

OTHER PUBLICATIONS

Extended European Search Report dated Dec. 3, 2019 in EP Patent Application No. 17805380.7. 6 pages.

\* cited by examiner

COFFEE DISPENSER

CROSS-REFERENCES TO RELATED APPLICATIONS

This application is a continuation application of International Patent Application No. PCT/AU2017/050379 entitled "A COFFEE DISPENSER," filed on Apr. 27, 2017, which claims priority to Australian Patent Application No. 2017900277, filed on Jan. 31, 2017; and to Australian Patent Application No. 2016902129, filed on Jun. 2, 2016, all of which are herein incorporated by reference in their entirety for all purposes.

FIELD OF THE INVENTION

The present invention relates to a coffee dispenser for dispensing coffee into a porta filter.

BACKGROUND OF THE INVENTION

There are several ways in which coffee is typically dispensed into a porta filter.

In one method, coffee is manually loaded into a filter basket of the porta filter, for example using a dedicated measuring spoon. However, this is time consuming and, depending on the care taken by the person dispensing the coffee, can be messy and can result in variation in the amount of coffee that is loaded into the filter basket.

In an alternative method, an on-demand grinder is used, the grinder dispensing coffee in response to user activation in an amount dependent on a defined grinding time. The grind time is set in consideration of the grind size set in the grinder so that the correct amount of coffee for the grind size is dispensed. However, on-demand grinders tend to be slow to the extent that 6-7 seconds are required in order to dispense 18-20 g of coffee. In a busy environment, this can be problematic and cause undesirable delays in production of a coffee. Also, since the required grind time is dependent on the grind size, a change to the grind size also requires a change to the grind time, which is cumbersome and time consuming. In addition, such on-demand grinders can be messy, can result in excess waste and can result in a variation in the amount of coffee dispensed, particularly if the grind size and/or grind time is incorrectly set.

In a further alternative method, a grinder is used to feed coffee into a hopper and the hopper used to dispense coffee into receptacles of defined size. A user then controllably dispenses coffee into a porta filter from one of the receptacles. However, this type of device typically holds over 15 ground coffee serves, and as a consequence, depending on the frequency at which coffee is being dispensed, the coffee can lose its fragrance. In addition, since a limited number of dosage amounts can be set in the device, mismatches between the dispensed amount of coffee and the optimum volume of coffee required in a porta filter basket can occur. Also, unless coffee is discarded, a long delay can exist after an adjustment is made to the grind size, and it is not uncommon for 16-20 coffee serves to be dispensed before coffee with the new grind size is dispensed. In addition, such grinder/doser arrangements can be messy and can result in excess waste.

SUMMARY OF THE INVENTION

In accordance with a first aspect of the present invention, there is provided a coffee dispenser for dispensing coffee into a porta filter of a coffee machine, the coffee dispenser comprising:

an inlet for receiving ground coffee;
a ground coffee holder that receives ground coffee from the inlet; and
a porta filter carriage for receiving a porta filter, the porta filter carriage movable relative to the ground coffee holder between a closed position wherein ground coffee is restricted from exiting the ground coffee holder under gravity, and a dispensing position wherein ground coffee is able to fall under gravity from the ground coffee holder into a filter basket of a porta filter received in the porta filter carriage;
wherein when a porta filter is received in the porta filter carriage, movement of the porta filter carriage from the closed position to the dispensing position causes coffee to be dispensed into the filter basket, and subsequent movement of the porta filter carriage from the dispensing position to the closed position causes a scraping action to occur across the coffee disposed in the filter basket, thereby removing excess coffee from the filter basket.

In an embodiment, the porta filter carriage includes a substantially flat dispensing control member having a control plate and a cut out portion configured to receive a porta filter, the control plate arranged to contact a lower lip of the ground coffee holder to prevent egress of coffee from the ground coffee holder when the porta filter carriage is in the closed position, and the cut out portion aligning with the ground coffee holder to allow ground coffee to fall under gravity to the porta filter when the porta filter carriage is in the dispensing position.

In an embodiment, the coffee dispenser includes a slide mechanism arranged to facilitate reciprocal movement of the porta filter carriage relative to the ground coffee holder.

The slide mechanism may include at least one elongate member and associated slide portion slidably connected to the elongate member.

In an embodiment, the coffee dispenser includes a biasing mechanism arranged to bias the porta filter carriage towards the closed position. The biasing mechanism may include at least one spring.

In an embodiment, the coffee dispenser includes a holding member for supporting a porta filter received during use in the porta filter carriage.

In an embodiment, the distance between the ground coffee holder and the holding member is adjustable so that porta filters of differing height can be accommodated in the porta filter carriage.

In an embodiment, the holding member may be resiliently mounted so as to facilitate reception of porta filters of differing sizes into the porta filter carriage.

The porta filter carriage may include a downwardly extending portion, the holding member mounted on the downwardly extending portion, and the length of the downwardly extending portion being adjustable so that porta filters of differing height can be accommodated in the porta filter carriage.

In an embodiment, the coffee dispenser includes a dosage regulator arranged to control the amount of coffee dispensed into a porta filter received during use in the porta filter carriage such that the amount of coffee in the porta filter is a defined amount less than full by controlling the position of the porta filter relative to the ground coffee holder when the porta filter carriage is in the dispensing position.

In an embodiment, the dosage regulator includes at least one regulator member, wherein when a porta filter has an outlet spout at a defined location on the porta filter, a regulator member contacts the spout of the porta filter, whereby interaction between the or each spout and the or each respective regulator member determines the maximum travel distance of the porta filter carriage as the porta filter carriage moves from the closed position to the dispensing position.

In an embodiment, the dosage regulator includes a regulator body, at least one regulator rod slidably received in the regulator body, and at least one regulator member, wherein when a porta filter has an outlet spout at a defined location on the porta filter, a first end of the regulator rod contacts the spout of the porta filter and a second opposite end of the regulator rod contacts a regulator member, the position of the regulator member determining the maximum travel distance of the porta filter carriage as the porta filter carriage moves from the closed position to the dispensing position.

In an embodiment, the dosage regulator includes a regulator member mounted on the downwardly extending shaft and arranged to extend from the shaft towards a supporting wall of the coffee dispenser, wherein the length of the regulator member beyond the shaft is adjustable so as to thereby determine the maximum travel distance of the porta filter carriage as the porta filter carriage moves from the closed position to the dispensing position without contact with an outlet spout of a porta filter. In an embodiment, the coffee dispenser includes a biasing device for biasing the ground coffee holder and the porta filter disposed during use in the porta filter carriage towards each other.

The biasing device may include a spring arranged to bias the ground coffee holder towards the porta filter carriage. Alternatively, the biasing device may include a plurality of springs arranged to bias the ground coffee holder towards the porta filter carriage at locations substantially equidistantly disposed around the ground coffee holder.

In an embodiment, the coffee dispenser includes at least one scraper disposed in the ground coffee holder, the at least one scraper controllably movable through the ground coffee in the ground coffee holder to thereby discourage the ground coffee from clumping.

In an embodiment, the scraper is operatively associated with the porta filter carriage such that reciprocal movement of the porta filter carriage effects movement of the at least one scraper in the ground coffee holder.

In an embodiment, the coffee dispenser includes a pinion gear wheel rotatably mounted to the ground coffee holder, the at least one scraper extending into the ground coffee holder, and a rack mounted on the porta filter carriage, the rack engaging with the pinion gear wheel such that reciprocal movement of the porta filter carriage causes rotation of the pinion gear wheel and rotational movement of the at least one scraper in the ground coffee holder.

In an embodiment, the coffee dispenser includes a first inlet for receiving ground coffee from a coffee grinder and a second inlet for receiving ground coffee from an operator.

In an embodiment, the coffee dispenser includes a display arranged to communicate information associated with the coffee dispenser to an operator. The coffee dispenser may be arranged to show on the display information indicative of the amount of time since coffee was dispensed by the coffee dispenser.

BRIEF DESCRIPTION OF THE DRAWINGS

The present invention will now be described, by way of example only, with reference to the accompanying drawings, in which.

DESCRIPTION OF AN EMBODIMENT OF THE INVENTION

Referring to FIGS. 1 to 7 of the drawings, there is shown a coffee dispenser 10 and suitable porta filters 26a, 26b for use with the coffee dispenser 10.

It will be understood that the coffee dispenser 10 may form part of a greater ground coffee production system or apparatus, for example that includes components for receiving coffee beans and grinding the coffee beans to produce ground coffee.

The coffee dispenser 10 includes a receptacle portion 12 arranged to receive ground coffee and supply the ground coffee to a dispensing portion 14 that controls dispensation of the ground coffee to a porta filter 26a, 26b received during use in the dispensing portion 14.

The receptacle portion 12 includes a receptacle body 16 that includes a lid 18 arranged to cover a ground coffee aperture 19, the lid 18 and aperture 19 usable to enable an operator to view inside the receptacle portion 12, carry out basic maintenance in the receptacle portion 12 or to facilitate manual disposal of ground coffee in the receptacle portion 12; and a display 20 arranged to display information to a user, such as the amount of time since the last dispensation of coffee and thereby how long ground coffee has been disposed in the receptacle portion and/or the number of coffee dispensations.

The dispensing portion 14 includes a dispensing portion housing 22, and a porta filter carriage 24 (shown more particularly in FIGS. 5 and 7) for receiving a porta filter 26a, 26b. The porta filter carriage 24 is reciprocably movable relative to the dispensing portion housing 22 between a closed position wherein ground coffee is restricted from falling from the receptacle portion 12 into a filter basket of a porta filter received in the porta filter carriage 24, and a dispensing position shown in FIGS. 2 and 6 wherein ground coffee is able to fall under gravity from the receptacle portion 12 into the filter basket of the porta filter 26a, 26b.

Figure 4A:
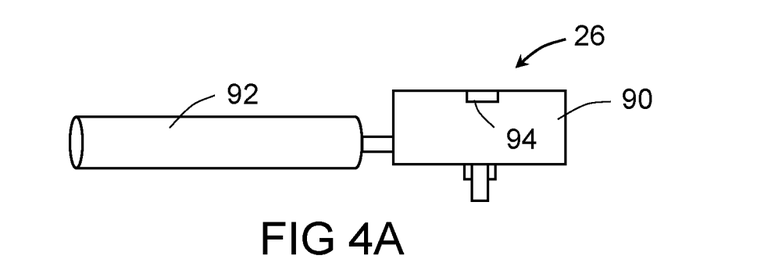
FIGS. 4A, 4B and 4C are diagrammatic side and end views of example porta filters that may be used with the coffee dispenser shown in FIGS. 1 to 3.
Figure 4B:
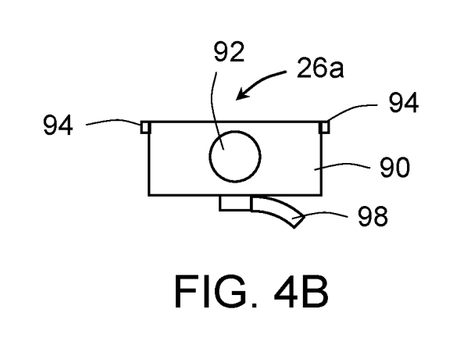
Figure 4C:
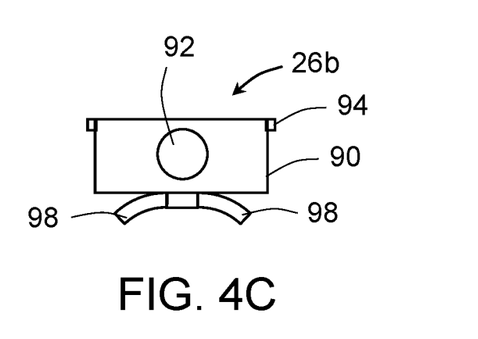

Example porta filters 26a, 26b are shown in FIGS. 4A to 4C. The porta filter 26a shown in FIG. 4B is of a type that has a single outlet spout 98, and the porta filter 26b shown in FIG. 4C is of a type that has a double outlet spout 98.

Figure 5:
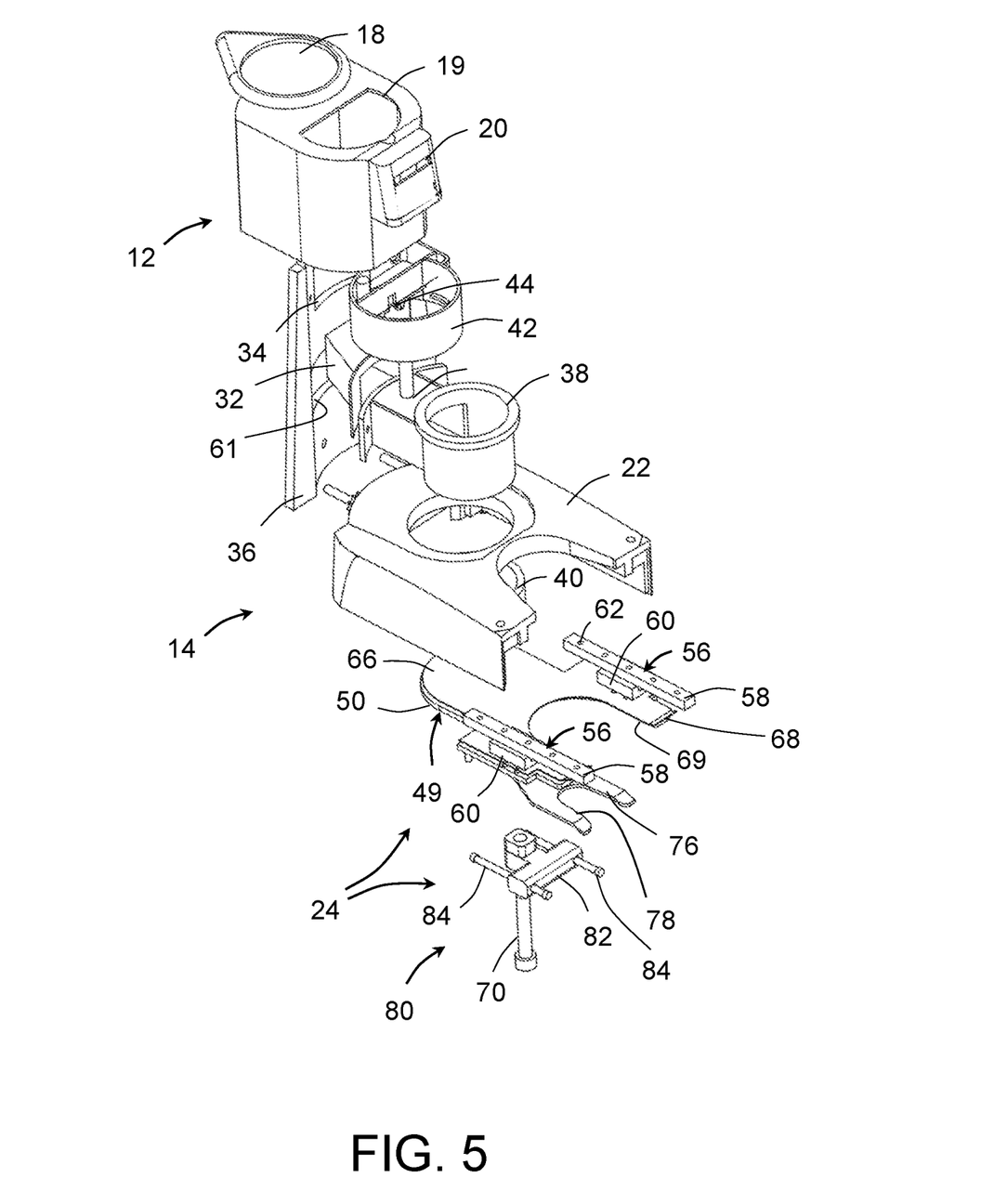
FIG. 5 is a diagrammatic exploded perspective view of the coffee dispenser shown in FIGS. 1 to 3.
Figure 6:
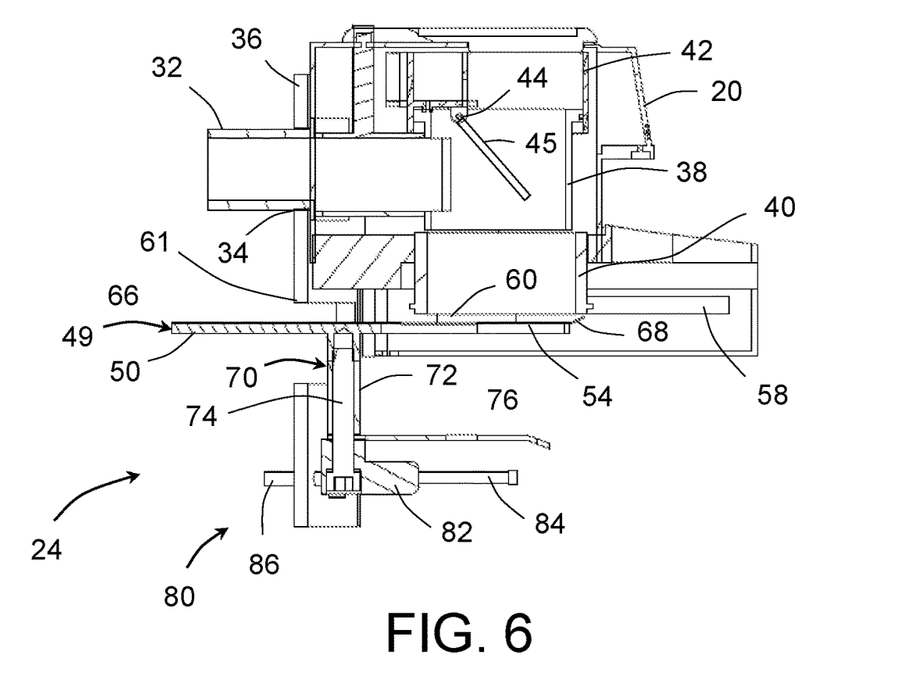
FIG. 6 is a diagrammatic cross sectional view of the coffee dispenser shown in FIGS. 1 to 3 taken along the line VI-VI in FIG. 3 in the direction of the arrows.
Figure 7:
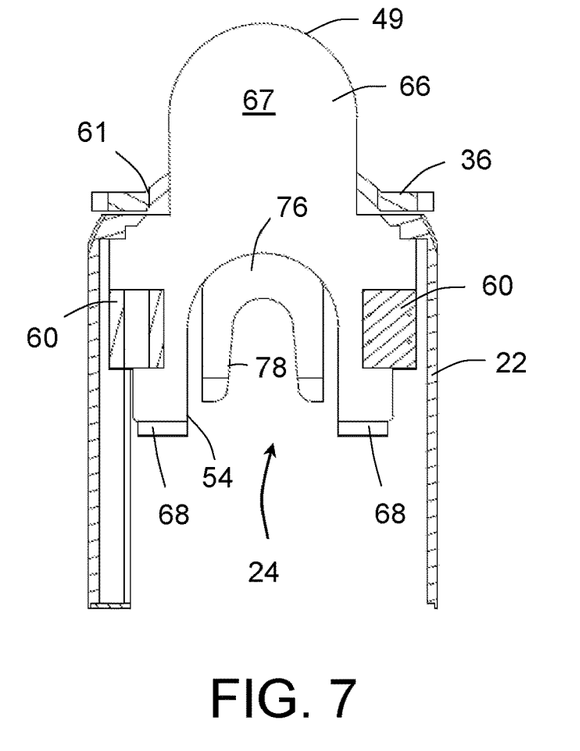
FIG. 7 is a diagrammatic cross sectional view of the coffee dispenser shown in FIGS. 1 to 3 taken along the line VII-VII in FIG. 3 in the direction of the arrows.

Referring in particular to FIGS. 5 and 6, the receptacle portion 12 includes a coffee inlet passageway 32 that extends through a coffee inlet aperture 34 formed in a supporting wall 36. The coffee inlet passageway 32 is arranged to receive ground coffee during use, for example from a grinder and to feed the ground coffee to a ground coffee receiver 38 that in this example is of cylindrical configuration. The ground coffee receiver 38 is in communication with a ground coffee holder 40 that receives and holds ground coffee prior to dispensation into a filter basket of a porta filter 26a, 26b.

However, it will be understood that instead of supplying ground coffee directly from a grinder, ground coffee may instead be manually introduced into the ground coffee holder, for example through the ground coffee aperture 19.

The receptacle portion 12 also houses a grinder control module 42 that has a device for controlling the amount of ground coffee that is received into the receptacle portion 12, in this example by controlling the amount of coffee that is ground by a coffee grinder (not shown) connected during use to the coffee inlet passageway 32. In this example, the controlling device includes a limit switch 44 arranged to cease operation of the grinder when the amount of ground coffee in the receptacle portion 12 substantially reaches a defined amount. The limit switch 44 may be triggered using a pivotable door 45, as shown in FIG. 6, that is urged to move as coffee travels through the coffee inlet passageway 32 and fills the ground coffee holder 40.

While in the present embodiment a limit switch 44 is used to control operation of the grinder, it will be appreciated that other arrangements are possible for controlling the amount of coffee that is received in the receptacle portion 12. For example, one or more sensors may be used to provide an indication of the amount of coffee in the receptacle portion 12, including one or more laser, ultrasound and/or radar sensors.

The limit switch 44 may be used to trigger recommencement of coffee grinding and in this way a signal from the limit switch may be used to determine occurrence of a dispensing operation and thereby the time since the last dispensing operation shown on the display 20 and/or the number of coffee dispensations.

Alternatively, the coffee dispenser 10 may include one or more sensors arranged to detect sliding movement of the porta filter carriage 24, the detected sliding movement being used to determine occurrence of a dispensing operation and thereby the time since the last dispensing operation shown on the display 20 and/or the number of coffee dispensations.

In order to determine the time since the last dispensing operation, the signal from the limit switch may be used to reset and subsequently start a counter, the counter providing timing information to the display 20.

The receptacle portion 12 may also include a light source arranged to illuminate the display and/or signage disposed on the coffee dispenser. The light source may include an LED.

Referring in particular to FIGS. 2, 3, 5 and 7, the dispensing portion 14 includes a generally flat dispensing control member 49 arranged to rest against a lower lip of the ground coffee holder 40 and slide relative to the lower lip as the porta filter carriage 24 moves relative to the receptacle portion 12 between the closed position and the dispensing position.

The dispensing control member 49 in this example includes a control plate 50 having a cut out portion 54, the control plate 50 laminated to a control web 66 having a cut out portion 69 and upwardly extending lip portions 68.

The dispensing portion 14 also includes at least one slide mechanism 56 arranged to facilitate slidable movement of the dispensing control member 49 relative to the lower lip of the ground coffee holder 40. In this example, as shown more particularly in FIG. 5, 2 slide mechanisms 56 are provided, each slide mechanism 56 including an elongate member 58 and a slide portion 60 movably connected to the elongate member 58 so that the slide portion 60 can move reciprocably relative to the elongate member 58. The elongate members 58 are fixed to an underside portion of the dispensing portion housing 22, for example using screws that extend through fixing apertures 62 provided in the elongate members 58. A plate aperture 61 is provided in the supporting wall 36 so as to enable the dispensing control member 49 to extend through the supporting wall 36 when the porta filter carriage 24 moves towards the dispensing position.

In this example, the dispensing portion 14 also includes a biasing mechanism arranged to bias the porta filter carriage 24 towards the closed position. In this example, springs (not shown) associated with the slide mechanisms 56, for example incorporated into the slide mechanisms 56, are provided for this purpose.

As best shown in FIG. 6, a shaft 70 extends downwardly of the dispensing control member 49, the length of the shaft 70 being adjustable, in this example by virtue of nested first and second shaft portions 72, 74 that can slide relative to each other and are fixable relative to each other, for example using a grub screw (not shown).

Mounted on the shaft 70 is a holding plate 76 that has a cut out portion 78, and a dosage regulator 80 (best shown in FIG. 6) arranged to control the amount of coffee dispensed into a porta filter 26 during use, and therefore how much less than full the porta filter basket will be after dispensation of coffee. The dosage regulator 80 includes a regulator body 82 and at least one regulator rod 84 that extends through the regulator body 82 and is slidable relative to the regulator body 82. Each regulator rod 84 cooperates with a respective regulator screw 86 mounted in the supporting wall 36. The amount of each regulator screw 86 that extends beyond the supporting wall 36 is adjustable by rotating the regulator screw 86, and in this way the amount of the regulator rod 84 that extends beyond the regulator body 82 when the dispensing control member 49 is in the dispensing position is also set by the position of the regulator screw 86 associated with the regulator rod 84.

The dosage regulator 80 and the associated regulator screws 86 cooperate to set the position of the dispensing control member 49 when the dispensing control member 49 is in the dispensing position and thereby the amount of coffee dispensed in the filter basket 90. The amount of coffee dispensed is automatically set by virtue of interaction between single or double outlet spouts 98 on a porta filter 26, the regulator rods 84 and the regulator screws 86.

In this way, the coffee dosage can be automatically modified in order to modify the dispensation amount of single and/or double porta filters less than full.

However, it will be understood that other arrangements for achieving automatic adjustment of coffee dosage are possible. For example, the dosage regulator may include regulator screws 86 that interact directly with the single or double outlets/spouts 98 on a porta filter 26a, 26b, without the need for the regulator rods 84 mounted in the regulator body 82.

Figure 10:
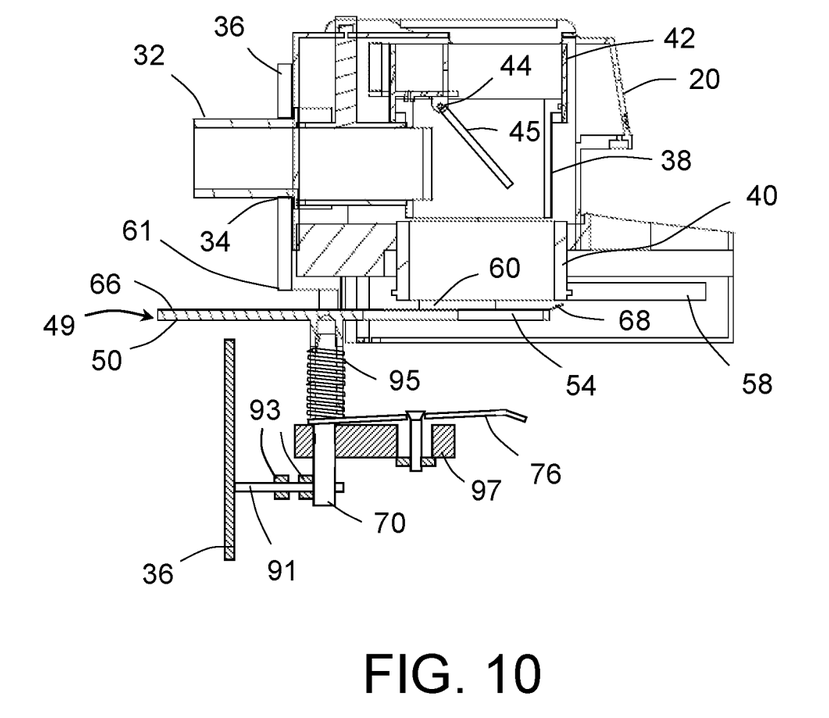
FIG. 10 is a diagrammatic cross-sectional view of an alternative coffee dispenser including the dispensing portion and receptacle portion shown in FIGS. 8 and 9.

In a further alternative arrangement, as shown for example in FIG. 10, a dosage regulator 91 may be mounted on the shaft 70, and arranged to extend from the shaft 70 towards the supporting wall 36. The length of the dosage regulator 91 beyond the shaft 70 is adjustable, in this example using at least one adjustment nut 93.

It will be appreciated that the alternative dosage regulator 91 determines the amount of coffee received in a porta filter basket by virtue of contact between the dosage regulator 91 and the supporting wall 36 only, and is not dependent on contact between the dosage regulator 90 and the single or double outlets/spouts 98 on a porta filter 26a, 26b. As a consequence, it will also be appreciated that the alternative dosage regulator 91 is capable of regulating the amount of coffee received in a bottomless porta filter, that is, a porta filter that does not include spouts.

In this example, the alternative dosage regulator 91 serves to more reliably regulate the amount of coffee received in a double shot porta filter 26b than the dosage regulator 80 shown in FIG. 6, because with the dosage regulator 80 shown in FIG. 6, insertion of a porta filter into the porta filter carriage 24 with the spout(s) extending non-transversely to the insertion direction can cause errors in the amount of coffee received in the porta filter basket.

Also shown in FIG. 10 is a biasing arrangement for providing the holding plate 76 with a degree of resilient movement to facilitate reception of porta filters of slightly different sizes, whilst at the same time biasing the porta filter received on the holding plate 76 towards the dispensing control member 49. For this purpose, the holding plate 76 is resiliently connected to the shaft and a support portion 97, in this example using a spring 95.

When the dispensing portion 14 receives a porta filter 26a, 26b during use, the filter basket 90 of the porta filter 26a, 26b is received in the cut out portion 54 defined in the control plate 50 of the dispensing control member 49, with the tabs 94 of the porta filter 26a, 26b disposed below the control plate 50, the upper lip of the filter basket 90 adjacent the control web 66, the filter basket aligned with the cut out portion 66 in the control web 66, and the filter basket 90 resting on the holding plate 76. The lip portions 68 serve to guide the porta filter 26a, 26b towards the space defined between the holding plate 76 and the control plate 50.

The porta filter carriage 24 is biased towards the closed position and is therefore initially disposed in the closed position. In the closed position, the control web 66 of the dispensing control member 49 is disposed against a lower lip of the ground coffee holder 40 so that coffee is retained in the ground coffee holder 40 by the dispensing control member 49.

When a porta filter 26a, 26b is received in the porta filter carriage 24 and the porta filter carriage 24 is disposed in the dispensing position, the cut out portions 54, 69 align with the ground coffee holder 40 so that coffee in the ground coffee holder 40 can flow under gravity from the ground coffee holder 40 through the cut out portions 54, 69 and into the filter basket 90 of the porta filter 26a, 26b engaged with the porta filter carriage 24.

Subsequent movement of the porta filter carriage 24 in an opposite direction moves the porta filter carriage 24 from the dispensing position to the closed position. This causes the control web 66 and the upper lip of the porta filter basket 90 to interact with the ground coffee holder 40 to remove any excess coffee from the filter basket 90 and ensure that an upper surface of the coffee grounds in the filter basket is substantially level and aligned with the upper lip of the filter basket 90.

In order to ensure that firm contact is made between the control web 66 and the lower lip of the ground coffee holder 40 as the filter basket 90 slides relative to the ground coffee holder 40, a suitable biasing device is provided to resiliently urge the ground coffee holder 40 towards the filter basket 90. In this example, the biasing device is a spring 95.

An example will now be described during use with reference to the embodiment shown in FIGS. 1 to 7 wherein ground coffee is supplied by a grinder (not shown) connected to the coffee dispenser 10.

During use, coffee beans are loaded into the grinder and, in response to an activation signal provided by the limit switch 44, ground coffee is supplied by the grinder through the coffee inlet passageway 32 to the ground coffee holder 40 until the limit switch 44 sends a signal to the grinder to indicate that sufficient coffee grounds are present in the ground coffee holder 40.

When a user desires to make a coffee, a porta filter 26a, 26b is engaged with the porta filter carriage 24 by receiving the filter basket 90 of the porta filter 26a, 26b in the cut out portion 54 of the control plate 50, with the filter basket 90 disposed below and aligned with the cut out portion 69 of the control web 66, and the filter basket 90 disposed between the control web 66 and the holding plate 76. If the separation between the dispensing control member 49 and the holding plate 76 is not suitable for the height of the porta filter 26a, 26b, the separation distance between the dispensing control member 49 and the holding plate 76 can be adjusted by modifying the length of the shaft 70. Minor differences in porta filter height can be tolerated if the holding plate 76 is resiliently mounted relative to the shaft 70, as shown in FIG. 10.

Figure 1:
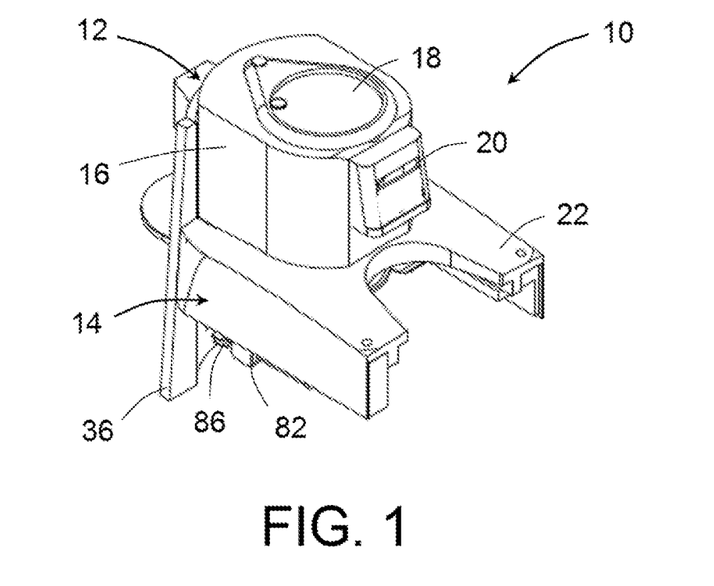
FIG. 1 is a diagrammatic upper perspective view of a coffee dispenser in accordance with an embodiment of the present invention.
Figure 2:
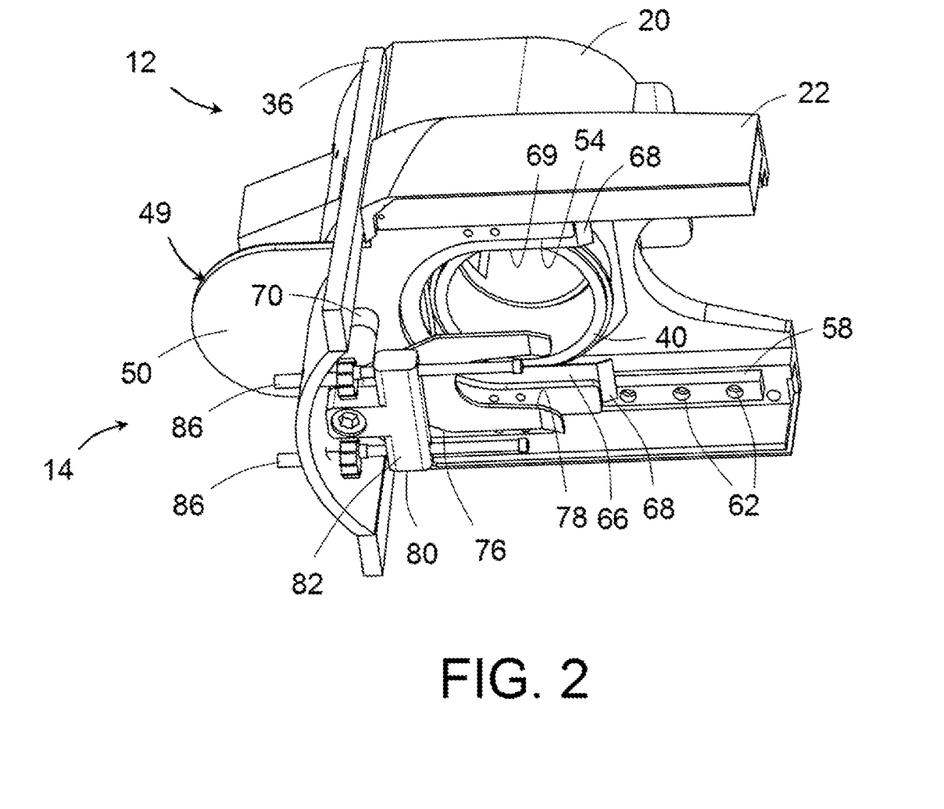
FIG. 2 is a diagrammatic lower perspective view of the coffee dispenser shown in FIG. 1.
Figure 3:
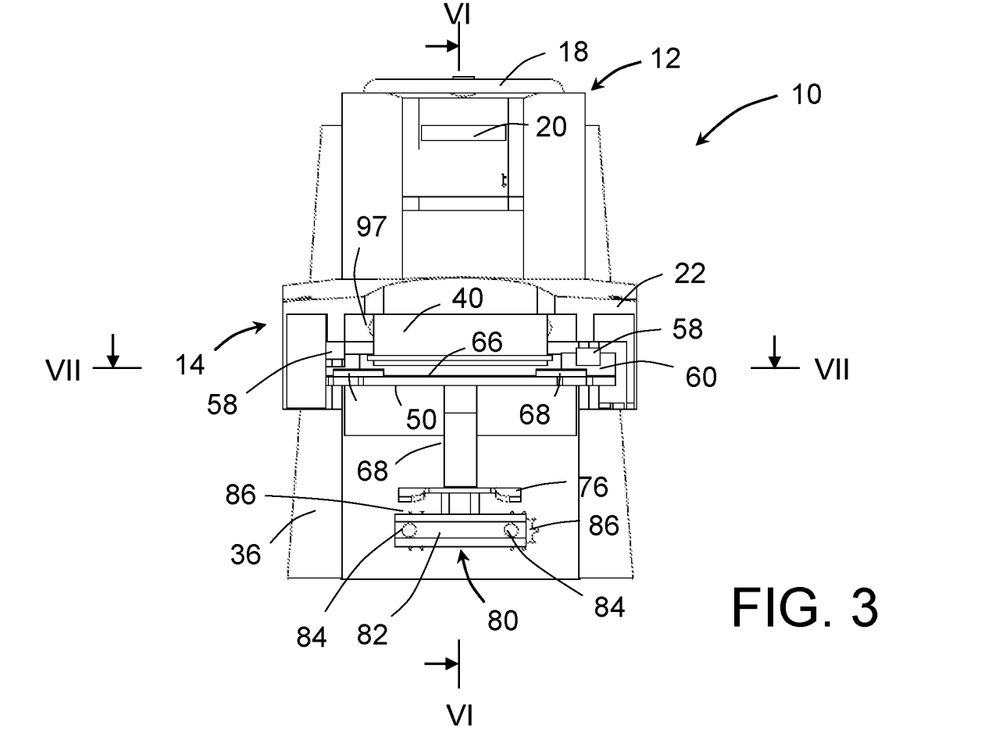
FIG. 3 is a diagrammatic front view of the coffee dispenser shown in FIGS. 1 and 2.

With the porta filter 26a, 26b engaged with the porta filter carriage 24, the user holds the handle 92 of the porta filter 26a, 26b and pushes the porta filter 26a, 26b and engaged porta filter carriage 24 so as to cause the porta filter carriage 24 to slide from the closed position to the dispensing position shown in FIGS. 2 and 6. With the porta filter carriage 24 in the dispensing position, ground coffee in the ground coffee holder 40 is able to fall into the filter basket 90.

The user then removes the pushing force on the porta filter carriage 24, which causes the porta filter carriage 24 to move from the dispensing positon to the closed position under action of the biasing mechanism (not shown). This causes the lower lip of the ground coffee holder 40 to scrape excess coffee from the porta filter basket 90, and the control plate 50 to scrape across the lower lip of the ground coffee holder 40. In this way, a mound of excess coffee disposed above the upper lip of the filter basket 90 is removed and retained in the ground coffee holder 40.

The amount of coffee dispensed into the filter basket 90 can be modified by setting the travel distance of the porta filter carriage 24 using the dosage regulator 80, 91. By adjusting the dosage regulator 80, 91, the location of the filter basket 90 relative to the ground coffee holder when the porta filter carriage 24 is in the dispensing position can be set, and therefore the amount of coffee grounds that falls into the filter basket when the porta filter carriage 24 is in the dispensing position can be set. By appropriately setting the dosage regulator 80, 91, the amount of coffee dispensed can be automatically set to a level that is a defined controllable amount less than full.

Figure 8:
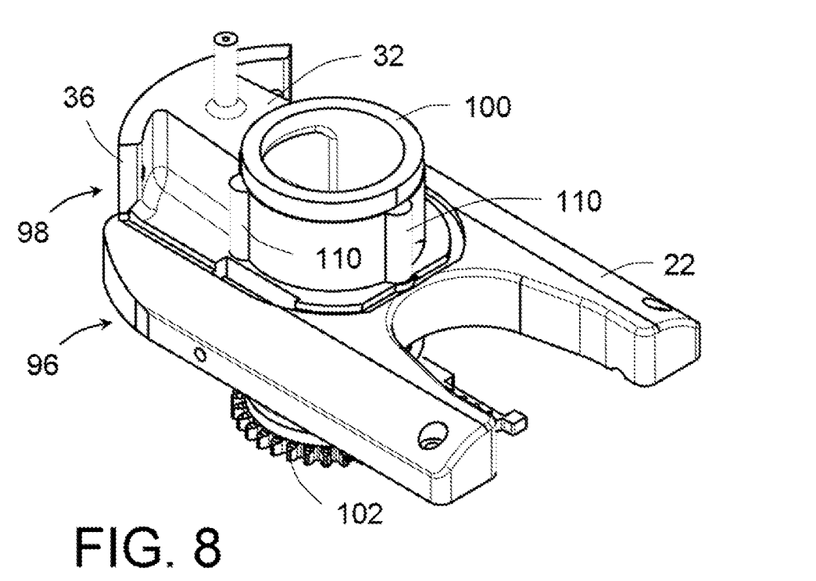
FIG. 8 is a diagrammatic perspective representation of a dispensing portion and receptacle portion of an alternative coffee dispenser in accordance with an embodiment of the present invention.
Figure 9:
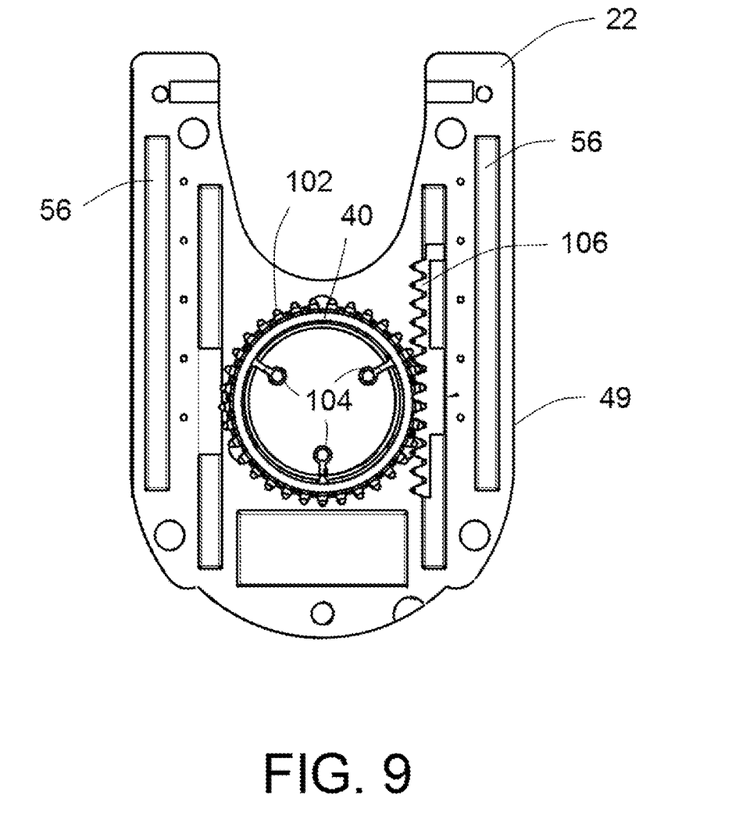
FIG. 9 is a diagrammatic lower view of the dispensing portion and receptacle portion shown in FIG. 8.

In some circumstances, coffee granules received in the ground coffee receiver 38 and the ground coffee holder 40 can clump together, which can affect the flow of coffee from the ground coffee holder 40 and thereby the dosage of coffee transferred to a porta filter during use. In order to reduce the likelihood that this will occur, an alternative dispensing portion 96 and receptacle portion 98, as shown in FIGS. 8 and 9 may be provided. Like and similar features are indicated with like reference numerals.

The receptacle portion 98 includes a ground coffee receiver 100 that receives ground coffee during use from a grinder through the coffee inlet passageway 32 and supplies the ground coffee to the ground coffee holder 40. Rotatably mounted to a lower circumferential end of the ground coffee holder 40 is a pinion gear wheel 102 provided with scrapers 104 that extend upwardly into the ground coffee holder 40, and optionally also into the ground coffee receiver 100. Mounted on the dispensing control member 49 is a rack 106 that engages with the pinion gear wheel 102 such that reciprocal movement of the rack 106 with reciprocal movement of the dispensing control member 49 causes rotation of the pinion gear wheel 102 and rotational movement of the scrapers 104 in the ground coffee holder 40. In this way, as the porta filter 26 is moved between the dispensing positon and the closed position, the scrapers 104 move through the ground coffee in the ground coffee holder 40 to thereby discourage the ground coffee from clumping.

In the embodiment shown in FIGS. 1 to 7, the biasing device provided to resiliently urge the ground coffee holder 40 towards the dispensing control member 49 is a single spring 95 that extends around the ground coffee holder 40. However, since such a single spring can cause an uneven biasing force to be exerted on the dispensing control member 49, an alternative is envisaged wherein multiple biasing members are mounted at spaced locations around the ground coffee receiver 100. For example, as shown in FIG. 8, multiple cylindrical chambers 110 may be provided on the ground coffee receiver 100, each chamber 110 receiving a coil spring (not shown). In this example, 3 chambers 110 and corresponding coil springs are provided that are spaced equidistantly around the ground coffee receiver 100. In a variation, a control arrangement may be provided to controllably vary the biasing force exerted by the biasing device.

It will be appreciated that the coffee dispenser 10 enables a filter basket of a porta filter to be filled (or controllably substantially filled using the dosage regulator 80, 91) irrespective of the volume of the filter basket, and therefore an appropriate amount of coffee in the filter basket is ensured. Using the present coffee dispenser 10, irrespective of the size of the porta filter basket, by adjusting the dosage regulator 80, 91 it is possible to automatically completely fill the porta filter basket 90 or to controllably fill the porta filter basket 90 to a level that is a defined amount less than completely full. In this way, the correct dosage of coffee for a single or double porta filter can be achieved in a defined repeatable way.

It will also be appreciated that since the dosage of coffee introduced into the porta filter during use is controlled and excess coffee is retained in the ground coffee holder by the dispensing control member 49, the present coffee dispenser is able to dispense coffee accurately substantially without mess.

It will be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

What is claimed is:

1. A coffee dispenser comprising:
an inlet for receiving ground coffee;
a ground coffee holder that receives the ground coffee from the inlet and supplies the ground coffee to an outlet; and
a porta filter carriage for receiving a porta filter such that the porta filter is engageable with and disengageable from the porta filter carriage, the porta filter carriage movable relative to the ground coffee holder between a closed position wherein the ground coffee is restricted from exiting the ground coffee holder under gravity, and a dispensing position wherein the ground coffee is able to fall under gravity from the ground coffee holder into a filter basket of the porta filter received in the porta filter carriage,
wherein the porta filter carriage includes a flat dispensing control member having a control plate and a cut out portion configured to receive the porta filter, the control plate arranged to contact a lower lip of the ground coffee holder and cover the outlet of the ground coffee holder to prevent egress of coffee from the ground coffee holder when the porta filter carriage is in the closed position, and the cut out portion aligning with the outlet of the ground coffee holder when the porta filter is received in the cut out portion and the porta filter carriage is in the dispensing position to allow the ground coffee to fall under gravity to the porta filter,
wherein when the porta filter is received in the cut out portion of the porta filter carriage, application of a force on the porta filter by a user causes movement of the porta filter carriage from the closed position to the dispensing position, and wherein the control plate does not cover the outlet of the ground coffee holder and coffee to be dispensed into the filter basket, and subsequent movement of the porta filter carriage by the user from the dispensing position to the closed position causes the control plate to scrape across the coffee disposed in the filter basket, thereby removing excess coffee from the filter basket.

2. The coffee dispenser as claimed in claim 1, comprising a slide mechanism arranged to facilitate reciprocal movement of the porta filter carriage relative to the ground coffee holder.

3. The coffee dispenser as claimed in claim 1, comprising a biasing mechanism arranged to bias the porta filter carriage towards the closed position.

4. The coffee dispenser as claimed in claim 1, comprising a holding member for supporting the porta filter received during use in the porta filter carriage.

5. The coffee dispenser as claimed in claim 4, wherein a distance between the ground coffee holder and the holding member is adjustable so that porta filters of differing height can be accommodated in the porta filter carriage.

6. The coffee dispenser as claimed in claim 4, wherein the holding member is resiliently mounted so as to facilitate reception of porta filters of differing sizes into the porta filter carriage.

7. The coffee dispenser as claimed in claim 1, comprising a dosage regulator arranged to control an amount of coffee dispensed into the porta filter received during use in the porta filter carriage such that the amount of coffee in the porta filter is a defined amount less than full.

8. The coffee dispenser as claimed in claim 7, wherein the dosage regulator is arranged to control the amount of coffee dispensed into the porta filter received during use in the porta filter carriage by controlling the position of the porta filter relative to the ground coffee holder when the porta filter carriage is in the dispensing position.

9. The coffee dispenser as claimed in claim 8, wherein the dosage regulator includes at least one regulator member and the porta filter has at least one outlet spout, an outlet spout of the at least one outlet spout contacting a regulator member of the at least one regulator member as the porta filter carriage moves from the closed position to the dispensing position to define a maximum travel distance of the porta filter carriage.

10. The coffee dispenser as claimed in claim 8, wherein the porta filter has at least one outlet spout and the dosage regulator includes a regulator body, at least one regulator rod slidably received in the regulator body, and at least one regulator member, wherein an outlet spout of the at least one outlet spout of the porta filter contacts a first end of a regulator rod of the at least one regulator rod and a second opposite end of the regulator rod contacts a regulator member of the at least one regulator member as the porta filter carriage moves from the closed position to the dispensing position, a position of the regulator member determining a maximum travel distance of the porta filter carriage.

11. The coffee dispenser as claimed in claim 8, wherein the dosage regulator includes a regulator member mounted on a downwardly extending shaft and arranged to extend from the downwardly extending shaft towards a supporting wall of the coffee dispenser, wherein a length of the regulator member beyond the downwardly extending shaft is adjustable so as to thereby determine a maximum travel distance of the porta filter carriage as the porta filter carriage moves from the closed position to the dispensing position without contact with an outlet spout of the porta filter.

12. The coffee dispenser as claimed in claim 1, comprising a biasing device for biasing the ground coffee holder and the porta filter disposed during use in the porta filter carriage towards each other.

13. The coffee dispenser as claimed in claim 12, wherein the biasing device includes a spring arranged to bias the ground coffee holder towards the porta filter carriage.

14. The coffee dispenser as claimed in claim 12, wherein the biasing device include a plurality of springs arranged to bias the ground coffee holder towards the porta filter carriage at locations equidistantly disposed around the ground coffee holder.

15. The coffee dispenser as claimed in claim 1, comprising a display arranged to communicate information associated with the coffee dispenser to an operator.

16. The coffee dispenser as claimed in claim 15, wherein the coffee dispenser is arranged to show, on the display, information indicative of an amount of time since coffee was dispensed by the coffee dispenser.

* * * * *